United States Patent
Höver et al.

(10) Patent No.: US 7,571,066 B2
(45) Date of Patent: Aug. 4, 2009

(54) METHOD AND DEVICE FOR COMPENSATING THE MOUNTING TOLERANCES OF A DISTANCE SENSOR

(75) Inventors: Norbert Höver, Lippstadt (DE);
Thomas Ottenhues, Hörstel (DE)

(73) Assignee: Hella KGaA, Lippstadt (DE)

( * ) Notice: Subject to any disclaimer, the term of this patent is extended or adjusted under 35 U.S.C. 154(b) by 62 days.

(21) Appl. No.: 11/631,538

(22) PCT Filed: Jul. 5, 2005

(86) PCT No.: PCT/EP2005/053181

§ 371 (c)(1),
(2), (4) Date: Nov. 28, 2007

(87) PCT Pub. No.: WO2006/005696

PCT Pub. Date: Jan. 19, 2006

(65) Prior Publication Data
US 2009/0055117 A1    Feb. 26, 2009

(30) Foreign Application Priority Data
Jul. 9, 2004   (DE) ................. 10 2004 033 212

(51) Int. Cl.
*G01C 3/00* (2006.01)
*G06F 19/00* (2006.01)
(52) U.S. Cl. ............. 702/104; 356/4.01; 340/901
(58) Field of Classification Search ............... 702/104; 356/4.01; 340/901
See application file for complete search history.

(56) References Cited

U.S. PATENT DOCUMENTS

| | | | |
|---|---|---|---|
| 4,632,543 A * | 12/1986 | Endo | 356/5.08 |
| 6,122,040 A * | 9/2000 | Arita et al. | 356/4.01 |
| 6,327,029 B1 * | 12/2001 | Matsuoka | 356/5.01 |
| 6,363,619 B1 * | 4/2002 | Schirmer et al. | 33/288 |
| 6,418,775 B1 * | 7/2002 | Sager et al. | 73/1.79 |
| 6,636,172 B1 * | 10/2003 | Prestl et al. | 342/173 |
| 6,763,318 B1 * | 7/2004 | Winter et al. | 702/158 |
| 6,956,227 B2 * | 10/2005 | Miyazaki et al. | 250/559.38 |
| 7,106,421 B2 * | 9/2006 | Matsuura et al. | 356/4.01 |
| 7,167,235 B2 * | 1/2007 | Kikuchi | 356/4.01 |
| 7,304,602 B2 * | 12/2007 | Shinagawa et al. | 342/174 |
| 2002/0138233 A1 * | 9/2002 | Chretinat | 702/182 |

FOREIGN PATENT DOCUMENTS

| | | | |
|---|---|---|---|
| DE | 19746524 | * | 5/1998 |
| DE | 19751004 | * | 5/1999 |
| DE | 10019182 | * | 10/2001 |
| DE | 10200945 | * | 8/2003 |
| EP | 0899581 | * | 3/1999 |

* cited by examiner

*Primary Examiner*—Michael P. Nghiem
*Assistant Examiner*—Cindy H Khuu
(74) *Attorney, Agent, or Firm*—Robert C. Haldiman, Esq.; Husch Blackwell Sanders LLP

(57) ABSTRACT

The present invention relates to a distance sensor with a method and device that aid the compensation of mounting tolerances of a distance sensor, where compensation is provided with little effort, quickly and reliably. This is achieved by having the distance sensor (1) emit its rays (2) at an aperture angle (a) of 0.1° to 10° and pick up data while the vehicle is moving straight forward, and determining an angle error (6) by comparing the data picked up during a change of channels.

11 Claims, 3 Drawing Sheets

METHOD AND DEVICE FOR COMPENSATING THE MOUNTING TOLERANCES OF A DISTANCE SENSOR

CROSS-REFERENCE TO RELATED APPLICATIONS

This application claims priority from International Application No. PCT/EP/2005/053 181 filed Jul. 5, 2005 which claims priority from German Patent Application No. 10 2004 033 212 filed Jul. 9, 2004.

The subject matter of this current invention is a method of compensating mounting tolerances of a vehicle-mounted distance sensor according to the general term of Claim 1 hereunder plus a device that puts the method into practice.

An example of what distance sensors are used for in motor vehicles is to scan the area closely ahead of the vehicle and to make signals available to automatic speed control or other such uses. The sensor will measure an angle and at what distance it is to an object. Perfectly adjusting the distance sensor is a mandatory requirement to be able to correctly determine the lateral distance a vehicle has to an object at a specific point in time and, thus, to be able to properly assign the correct lane to the vehicle. Mounting tolerances produce an angle error, that is to say, a difference in angles between the reference and actual positions of the distance sensor, which will lead to wrong results of sensor value analysis. Driving the vehicle often produces significant mechanical loads for example when driving through potholes that may modify the original adjustment and its well-defined emitter angles. Sensor values therefore need to be corrected.

DE 197 46 524 A1 describes a setup for compensating the mounting tolerances of a vehicle-mounted distance sensor. Its distance sensor is characterized by a reference emitter angle defined in relation to the vehicle and an actual emitter angle which may differ from the reference angle. The setup features an analysis circuitry used to compute object distances and angles as a mean object angle which is defined as being equivalent to a reference bearing angle. The latter and the actual emitter angle are compared to result in an angular difference which is applied to correct the actual object angle. This approach demands quite a lot of memory capacity and computing power because errors will only be detected after some time. Moreover, this kind of compensation may become unreliable when the sensor is physically readjusted.

The present invention aims at providing a method and a device that aid the compensation of mounting tolerances of a vehicle-mounted distance sensor, where compensation is provided with little effort, quickly and reliably.

The tasks are completed by the properties of the separate claims. Emitting rays at an aperture angle between 0.1° and 10° and obtaining correction values from a comparison of the different data collected at the time channels are changed lead to an object normally being discovered by more than one of the rays. The present setup allows angles between the sensor and an object to be determined at a change of channels extremely accurately and with greater precision than has been previously known to the art. The results delivered by the different channels allow the detection of measuring errors caused by mounting tolerances of the distance sensor. There will be various data analysis options which can all be implemented with comparatively little effort. One key factor is that it is no longer necessary to keep a long-term repository of large volumes of data. Consequently, there is but little memory capacity required and measuring results are available immediately, i.e. without any need for collecting much data first. An analyzer can compute a correction value and provide a reliable compensation for situations where the mounting position of the distance sensor differs from the set reference position.

The ancillary claims describe the beneficial practical design of the invention.

Claims 2 through 4 describe different methods of analyzing various operating conditions.

Claims 5, 6, 8 and 9 describe particularly favorable emitter angles.

Examples further explain the invention

The following figures are included

DETAILED DESCRIPTION

Figure 1:
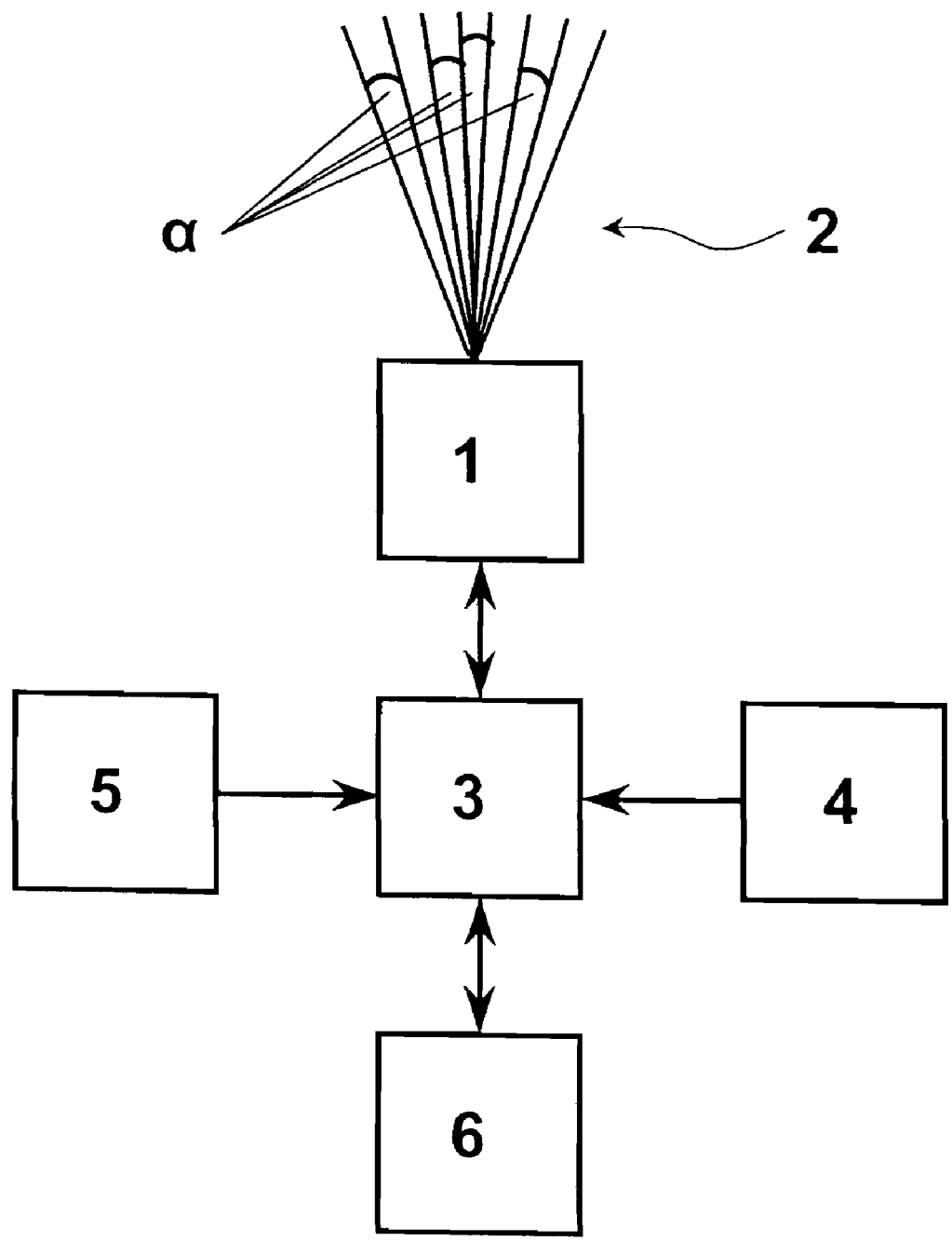
FIG. 1 shows the block diagram of a distance sensor.

FIG. 1 shows a distance sensor (1) installed somewhere near the front of a motor vehicle such that it emits sixteen rays (2)—only some of which are shown—which spread across a defined range of angles mainly pointing in the traveling direction, and receives the reflected rays (2). Every ray (2) has an aperture angle of 1°. In order not to confuse the picture, the aperture angle a is shown bigger than it really is. Every ray (2) is assigned a channel. In the depicted embodiment, distance sensor (1) is an optical sensor, e.g., an infrared laser.

Distance sensor (1) is electrically connected to an analyzer (3) which also acts as the control unit controlling distance sensor (1). The analyzer (3) also connects to a means (4) of determining whether the vehicle is moving straight ahead, a means (5) of determining the distance hitherto traveled, and a cruise control system (6). The means (4) of determining whether the vehicle is moving straight ahead for example includes a yaw rate sensor indicating how the angle of the longitudinal axis of the vehicle changes over time and plotting the graph on a set coordinate axis system; the traveling distance may be derived from the vehicle speed, for example.

Aperture angle a of distance sensor (1) can vary so that its rays (2) may have different aperture angles a.

During operation, i.e. while driving, the distance sensor (1) emits the rays (2). The analyzer (3) actuates the sensor such that it emits the rays (2) at cyclic clock pulse intervals. Reflected rays (2) are received by the distance sensor (1) and gated through to the analyzer (3), which takes each of the rays (2) after change of channels to compute the distance of an object (7) by looking at the time it took the ray (2) to return; the angle between the longitudinal axis of the vehicle and the object (7) is set by the emitter angle of the ray (2). Error compensation only relies on the data analyzed when the means (4) of determining straight ahead driving delivered a signal "driving straight ahead".

Figure 2:
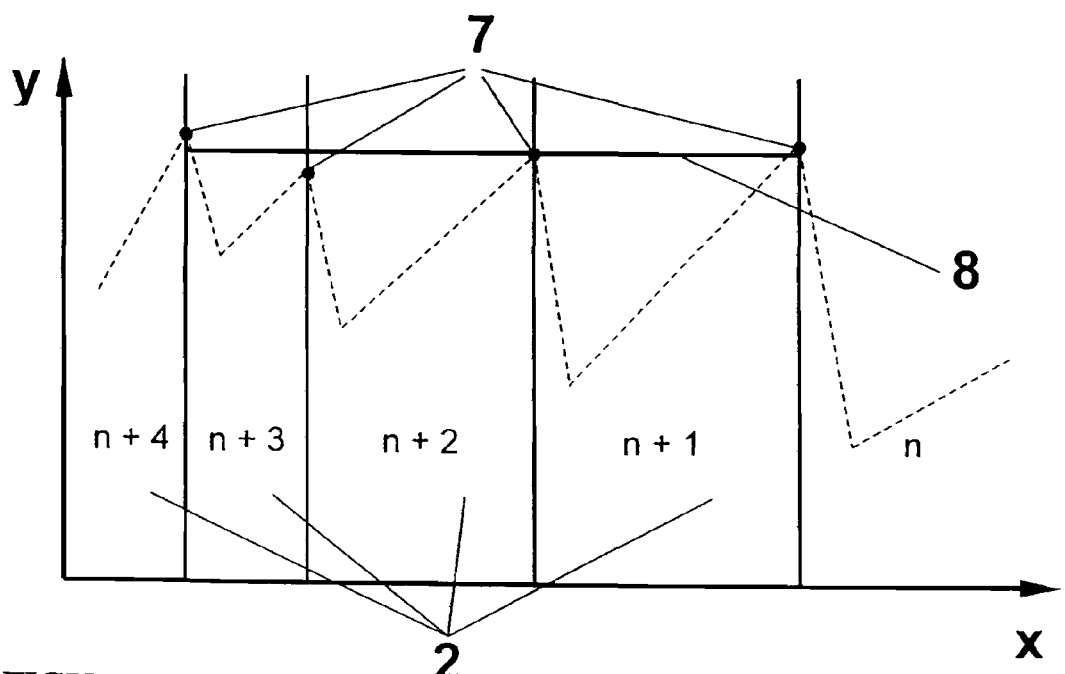
FIG. 2 shows the lateral distance between the sensor and a stationary object.
Figure 3:
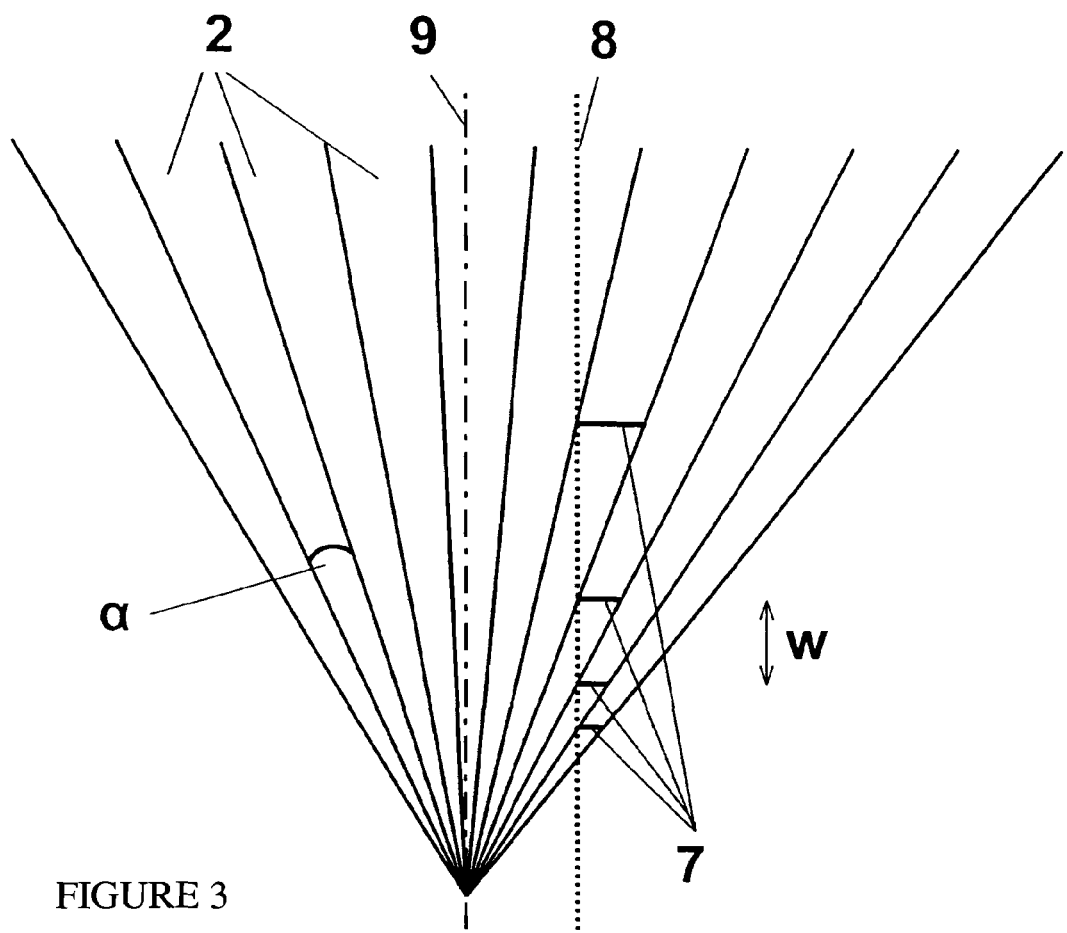
FIG. 3 shows the distance between the sensor and a stationary object.
Figure 4:
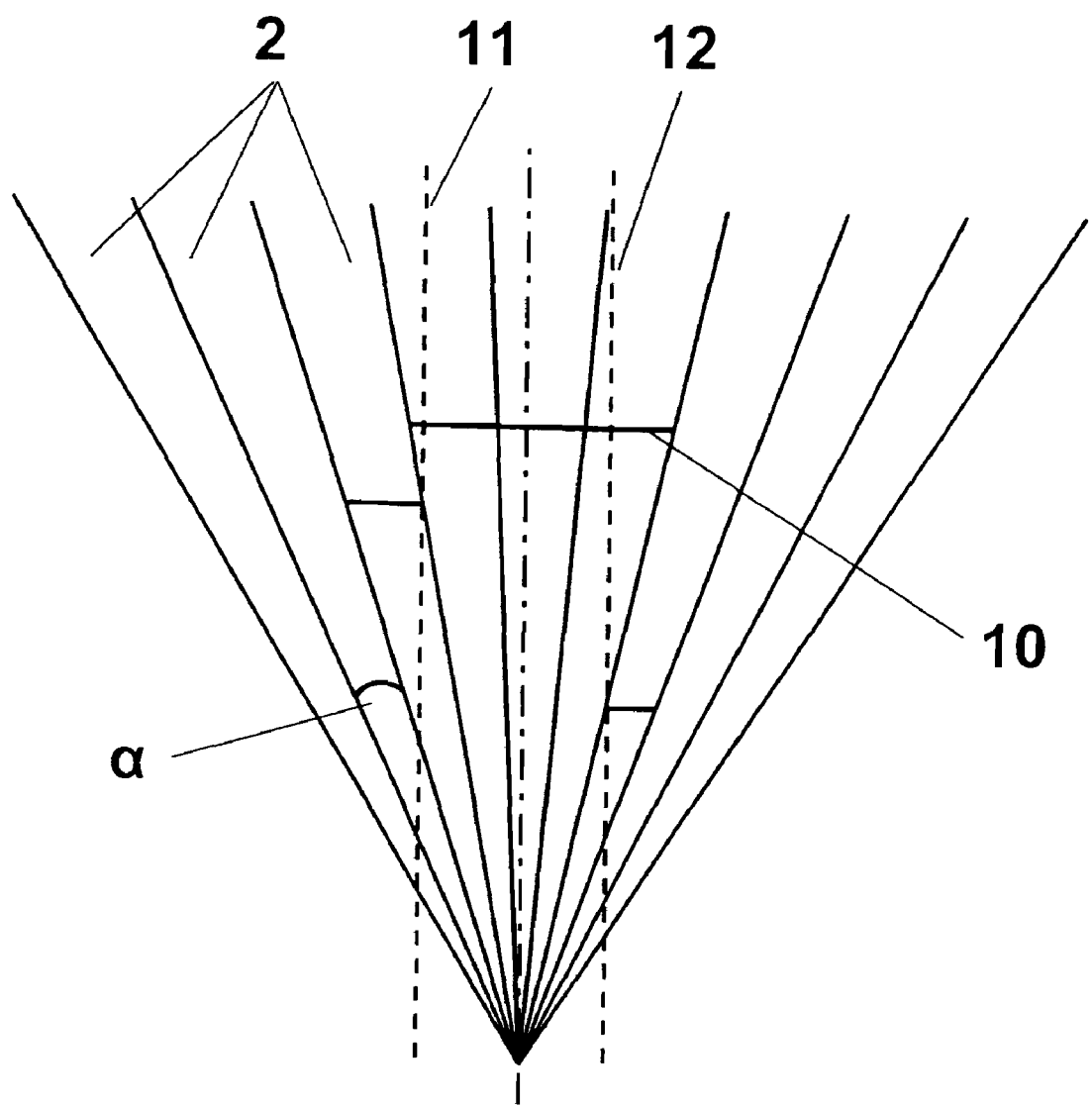
FIG. 4 shows the distance between the sensor and a moving object.

FIGS. 2 through 4 explain the different possibilities available to collect and compute data and to compensate 20 mounting tolerances.

When the vehicle moves past a stationary object (7) next to and off a road the rays (2) will discover this object (7) one after the other FIG. 2 shows for some of the rays (2) how the coordinates, i.e. the front distance (x axis) and the lateral distance (y axis) between the object (7) and the distance sensor (1), are measured while driving straight ahead and how the data of every change of channels is briefly stored. The stored coordinates are taken to compute a regression gradient (8) whose inclination m is the basis of the angle error δ of the distance sensor (1). If the distance sensor (1) is correctly adjusted, inclination m is=0.

The following formula is used to compute the angle error δ

$\delta = \arctan m = \arctan(\Delta y / \Delta x)$

The error is used as a value for correcting the data.

In the above formula, $\Delta x$ is the difference of the front distance and $\Delta y$ is the difference of the lateral distance that the object (7) has during the analysis interval as determined by means of the regression gradient (8).

FIG. 3 shows another possibility of determining a correction value for a vehicle driving past a stationary object (7). In the drawing, the aperture angles α of the channels appear wider than those used by the distance sensor (1). This array computes the distance w traveled by the vehicle between two changes of channels. It also determines the lateral distance between the object (7) and the distance sensor (1) measured at every change of channels. Results are averaged as mean distance a. These values are used to compute the actual angle β between a line (9) that is parallel to the central axis of the vehicle and the relevant ray (2), as follows:

$$\beta = \arcsin \frac{\alpha \cdot \sin\alpha}{w} - \frac{\alpha}{2}$$

Angle error δ is the difference between the computed angle β and the reference angle. If the angle error is null, the distance sensor (1) is correctly adjusted. The reference angle is corrected by the angle error δ.

FIG. 4 shows the situation regarding a second vehicle driving ahead of one's own car. In the drawing, the aperture angles α of the channels appear wider than those used by the distance sensor (1). In this case, the system computes the position of a left boundary (11) and the position of a right boundary (12) of the second vehicle (10) with reference to the vehicle at the time channels change. While driving straight ahead, the positions of the two boundaries (11, 12) are taken to determine the center of the second vehicle (10) as well as the mean front distance d between the two vehicles. The system also computes the lateral distance f between the centers of the two vehicles.

The angle error δ is computed using the following formula $\delta = \arcsin f/d$ The result is used as correction value.

If the distance sensor (1) is correctly adjusted and if all drivers involved behave normally, the angle error δ will be null.

The different methods described herein provide possibilities of correcting mounting tolerances which will work reliably in most situations.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of compensating the mounting tolerances of a vehicle-mounted distance sensor, comprising:

emitting from a distance sensor a plurality of rays, said plurality of rays being reflected by an object producing reflected rays, each of said rays being emitted at a different angle, each of said rays being emitted at an aperture angle of between 0.1° to 10° in relation to a longitudinal vehicle axis, and each of said rays being emitted at cyclic intervals;

receiving with said distance sensor said reflected rays, and representing every reflected ray with a reflected ray data on one channel;

determining when the vehicle is moving straight ahead;

said emitting and said receiving steps being executed while the vehicle is moving straight ahead;

comparing said reflected ray data from different channels to obtain a positional difference between channels;

calculating an angle error of the distance sensor based on said positional difference.

2. The method as in claim 1, wherein the reflected ray data consists of the coordinates of a stationary object; and a regression gradient is determined for all coordinates of the object with the angle error being an angle between the regression gradient and a straight reference line.

3. The method as in claim 1, wherein the reflected ray data consists of the coordinates of a stationary object; and a distance traveled between two subsequent changes of channels, an actual emitter angle is computed from the reflected ray data and compared with a reference value, and the angle error is the comparison difference.

4. The method as in claim 1, wherein the reflected ray data consists of different distances to a second vehicle driving ahead, where a lateral boundary of the second vehicle is detected, and the angle error is computed using a difference between a scanned center of the vehicle driving ahead and a center of a sensor vehicle.

5. The method as in claim 1, wherein the aperture angle of the rays is between 0.1° to 5°.

6. The method as in claim 1, wherein the aperture angle of the rays is 1°.

7. A compensating device to compensate for mounting tolerances of a vehicle mounted distance sensor, said compensating device comprising:

a distance sensor configured to emit a plurality of rays, said plurality of rays being reflected by an object producing reflected rays, each of said rays being emitted at a different angle, each of said rays being emitted at an aperture angle of between 0.1° degrees to 10° degrees from a longitudinal axis of the vehicle;

the distance sensor being further configured to receive said reflected rays;

a processor configured to assign one of a plurality of different channels to each of said plurality of reflected rays and representing every reflected ray with a reflected ray data on one channel, said processor being configured to emit one of said rays at cyclic intervals;

an element configured to determine when the vehicle is moving straight ahead; and said processor being further configured to compare said reflected ray data from said different channels to obtain an object position change between channels and compute an angle error of the distance sensor from said object position change between a first reflected ray and at least one other reflected ray, when the vehicle is moving straight ahead.

8. The device as in claim 7, wherein the aperture angle of the rays is between 0.1° and 5°.

9. The device as in claim 7, wherein the aperture angle of the rays is 1°.

10. The device as in claim 7, wherein the distance sensor is an infrared laser sensor.

11. The device as in claim 7, wherein the distance sensor has sixteen channels.

* * * * *